E. A. WALL.
SPRING WHEEL.
APPLICATION FILED MAR. 8, 1911.
1,001,715.
Patented Aug. 29, 1911.
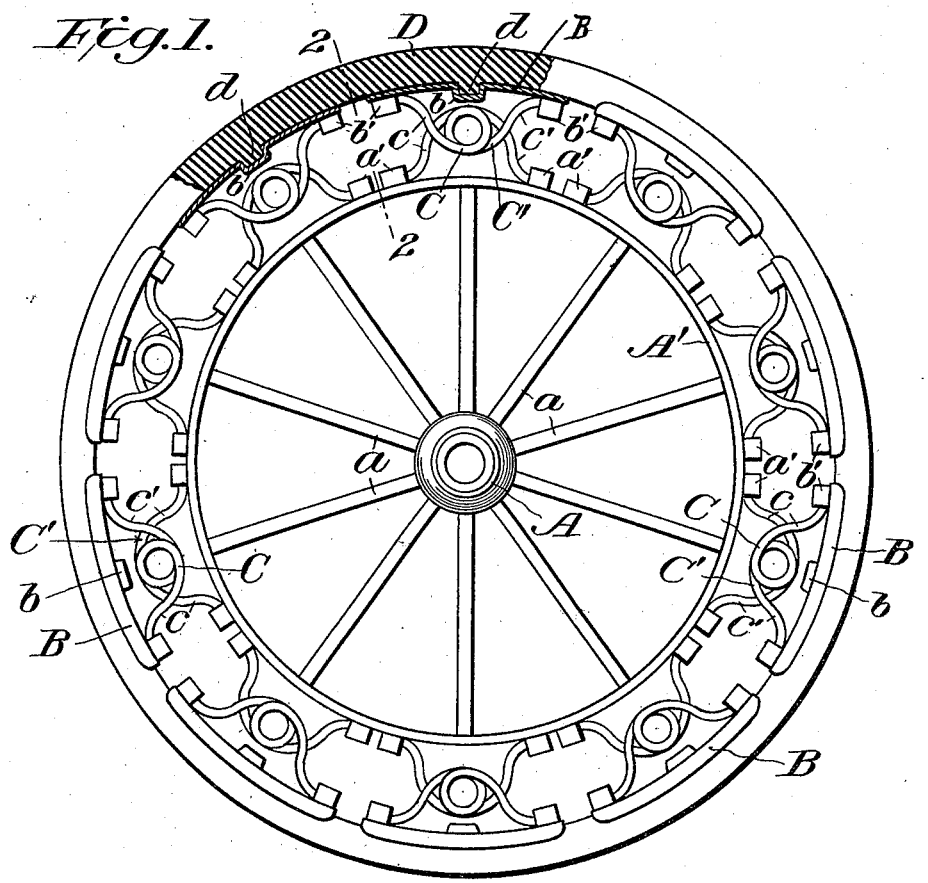
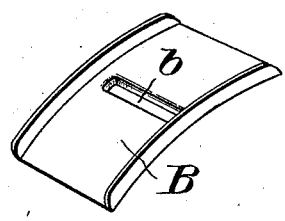
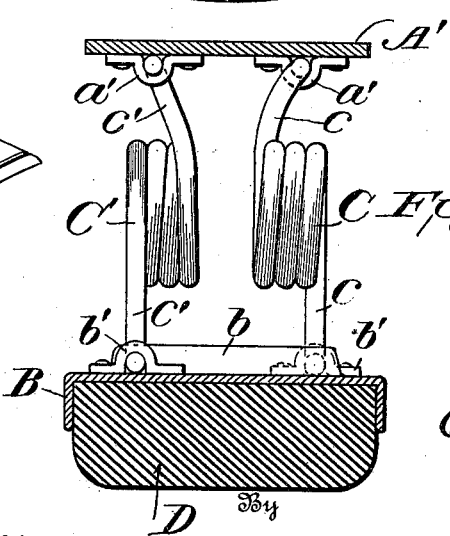
Witnesses
C. M. Walker.
J. M. Copenhaver.
Inventor
E. A. Wall
By Geo. H. Evans
Attorney

UNITED STATES PATENT OFFICE.

ENOS A. WALL, OF SALT LAKE CITY, UTAH.

SPRING-WHEEL.

1,001,715.  Specification of Letters Patent.  Patented Aug. 29, 1911.

Application filed March 8, 1911. Serial No. 613,036.

*To all whom it may concern:*

Be it known that I, ENOS A. WALL, a citizen of the United States, residing at Salt Lake City, in the county of Salt Lake and State of Utah, have invented certain new and useful Improvements in Spring-Wheels, of which the following is a specification.

My invention relates to spring-wheels.

The object of the invention is to provide a spring wheel which shall be simple in construction, efficient in operation, and in which the weight borne by the wheel will be as evenly distributed as possible. This object I accomplish by the construction shown in the accompanying drawing, in which—

Figure 1 is a sectional side elevation of a wheel embodying my improvements. Fig. 2 is a cross-section on line 2—2 of Fig. 1. Fig. 3 is a detail perspective of one of the outer rim-sections.

A designates the hub from which radiate spokes, $a$, connected at their outer ends by a circular metallic band A′, provided on its outer side with clips or fastenings $a'$. The outer rim of the wheel is formed of a series of flanged metallic plates B, spaced apart at their ends and provided between their ends in their outer faces with sockets $b$, and with clips $b'$.

C, C′ designate transversely arranged coiled springs; the ends $c$, $c$ of the spring C diverging and engaging respectively the clips $a'$ and $b'$, while the diverging ends $c'$, $c'$, of springs C′, project oppositely to the ends $c$, $c$, and engage other clips $a'$, $b'$. The upper extremities of each pair of springs engage the clips $b'$, at the ends of each plate or outer rim section B, so that there is a pair of springs under every plate or section.

D, is the rubber tire extending around the flanged plates B, and provided on its inner side with integral studs or projections $d$, which enter the sockets $b$, in the outer sides of the plates B and so prevent the tire from creeping. These interlocking studs and sockets $d$, $b$, also, in holding the tire D from traveling, cause it to be subjected to tensile strain between the plates B, B, and this adds greatly to the resiliency of the wheel and to the equal distribution of the weight borne thereby.

It will be seen that the load borne by the wheel will be supported by all the springs and that the stretching of the tire D, will assist the springs materially.

What I claim is:

A resilient wheel comprising a rim, an outer sectional rim formed of a circular series of socketed plates, springs transversely coiled between their ends and connected at their opposite diverging ends to the inner wheel member and opposite ends of the said plates, respectively; a pair of such springs to every outer section with their coils extending parallel to the axis of the wheel and in horizontal alinement, and a rubber tire carried by the said sections and having studs entering said sockets.

In testimony whereof I affix my signature in presence of two witnesses.

ENOS A. WALL.

Witnesses:
A. M. PARKINS,
GEO. H. EVANS.

Copies of this patent may be obtained for five cents each, by addressing the "Commissioner of Patents, Washington, D. C."